United States Patent [19]

DuVall

[11] 4,378,519
[45] Mar. 29, 1983

[54] TRANSDUCER SYSTEM WITH INCREASED TRACKING CAPABILITY

[75] Inventor: Wilbur E. DuVall, Victorville, Calif.

[73] Assignee: Xerox Corporation, Stamford, Conn.

[21] Appl. No.: 187,265

[22] Filed: Sep. 15, 1980

[51] Int. Cl.³ .............................................. G05B 1/01
[52] U.S. Cl. ................................... 318/608; 318/660; 360/77
[58] Field of Search ............... 318/660, 661, 608, 561, 318/599; 360/77

[56] References Cited
U.S. PATENT DOCUMENTS

| | | | |
|---|---|---|---|
| Re. 30,161 | 11/1979 | Gabor | 318/660 |
| 3,473,098 | 10/1969 | Waller | 318/660 X |
| 4,270,073 | 5/1981 | Harman | 360/77 |
| 4,272,818 | 6/1981 | McDaniel | 318/608 X |
| 4,319,172 | 3/1982 | Sieraozki | 318/608 |

Primary Examiner—B. Dobeck
Attorney, Agent, or Firm—Leonard Zalman

[57] ABSTRACT

The number of data tracks or positions that a transducer can access or track is increased, beyond that conventionally permitted by the transducer conductor spacing, by first providing a plurality of signals corresponding in number to the factor by which the tracking capacity of the transducer is to be increased, with all signals having a common frequency equal to that of the drive signals applied to the transducer stator windings and with each signal being phase delayed relative to the other signals by one or more clock increments, then accessing the signal having a phase corresponding to the data track to be tracked, providing from that accessed signal a plurality of additional relatively phase delayed signals, and applying each of the later phase delayed signals to one of a plurality of phase detectors each of which also receives an input corresponding to the squared transducer rotor signal whereby the phase detectors provide at their output width modulated signals having a low frequency component corresponding to the rotary position signal.

4 Claims, 4 Drawing Figures

TRANSDUCER SYSTEM WITH INCREASED TRACKING CAPABILITY

BACKGROUND OF THE INVENTION

It is necessary in many systems to bring a movable member to a stop at a precise location. For example, in a magnetic memory disk device bearing a number of information and servo tracks, it is required that the read/write head be positiond over a particular track. Likewise, in a high speed printer with intermittent print wheel movement, it is required that the print wheel be rotated so that a particular character is in the print position.

A position measuring transformer known as an Inductosyn is often used for achieving such positioning. The Inductosyn device, whether in a linear or rotary form, senses the movement of a shaft member based on the inductive coupling between a winding or windings on a fixed insulating member and a winding or windings on a movable insulating member separated from the fixed member by a small air gap. In a rotary transformer the members would be disks and each winging would inclinde a multiplicity of radially extending strip-like conductors connected in series by circumferential conductors so that alternate conductors carry current in the same direction and adjacent conductors carry current in radially opposite directions. The conductors are identical in shape and are spaced at uniform angular intervals in a circular arcuate array about the center of a pattern which they establish, the center being the effective center of the disk.

To achieve the high degree of accuracy needed for satisfactory operation, the conductors are deposited on the disk by a photoetching process. Generally, that process can provide a minimum conductor spacing sufficient to allow for only 32 tracking positions for each 21° of a two inch diameter disk. However, with the increasing track density now possible with magnetic disks, it is desired that greater than 32 tracking positions be available for each 21° of disk rotation. Accordingly, there is a need for a transducer system that can accommodate an increased number of tracking positions.

SUMMARY OF THE INVENTION

In accordance with the invention, the number of data tracks or positions that a transducer can access or track is increased, beyond that conventionally permitted by the transducer conductor spacing, by first providing a plurality of signals corresponding in number to the factor by which the tracking capacity of the transducer is to be increased, with all signals having a common frequency equal to that of the drive signals applied to the transducer stator windings and with each signal being phase delayed relative to the other signals by one or more clock increments, then accessing the signal having a phase corresponding to the data track to be tracked, providing from that accessed signal a plurality of additional relatively phase delayed signals, and applying each of the latter phase delayed signals to one of a plurality of phase detectors each of which also receives an input corresponding to the squared transducer rotor signal whereby the phase detectors provide at their output width modulated signals having a low frequency component corresponding to the rotary position signal. To provide a signal having an amplitude at all times directly proportional to the velocity of the rotor, a pair of the position signals which are phase displaced by 90° are differentiated to provide velocity signals, and each velocity signal is applied in both its regular and inverted form to a synchronous detector which receives other of the position signals as control signals. Thus, the circuit of the invention can provide increased transducer tracking capacity and a velocity signal having at all times an amplitude directly proportional to the rotor velocity.

DETAILED DESCRIPTION OF THE DRAWINGS

DETAILED DESCRIPTION OF THE INVENTION

The invention will be described in detail hereinafter in relation to circuit components that will increase by a factor of eight the number of data tracks that a conventional transducer can access. The increase by a factor of eight is not restrictive and it is contemplated that the invention can increase the amount of data tracks that a conventional transducer can access by factors of less than or more than eight.

Figure 1:
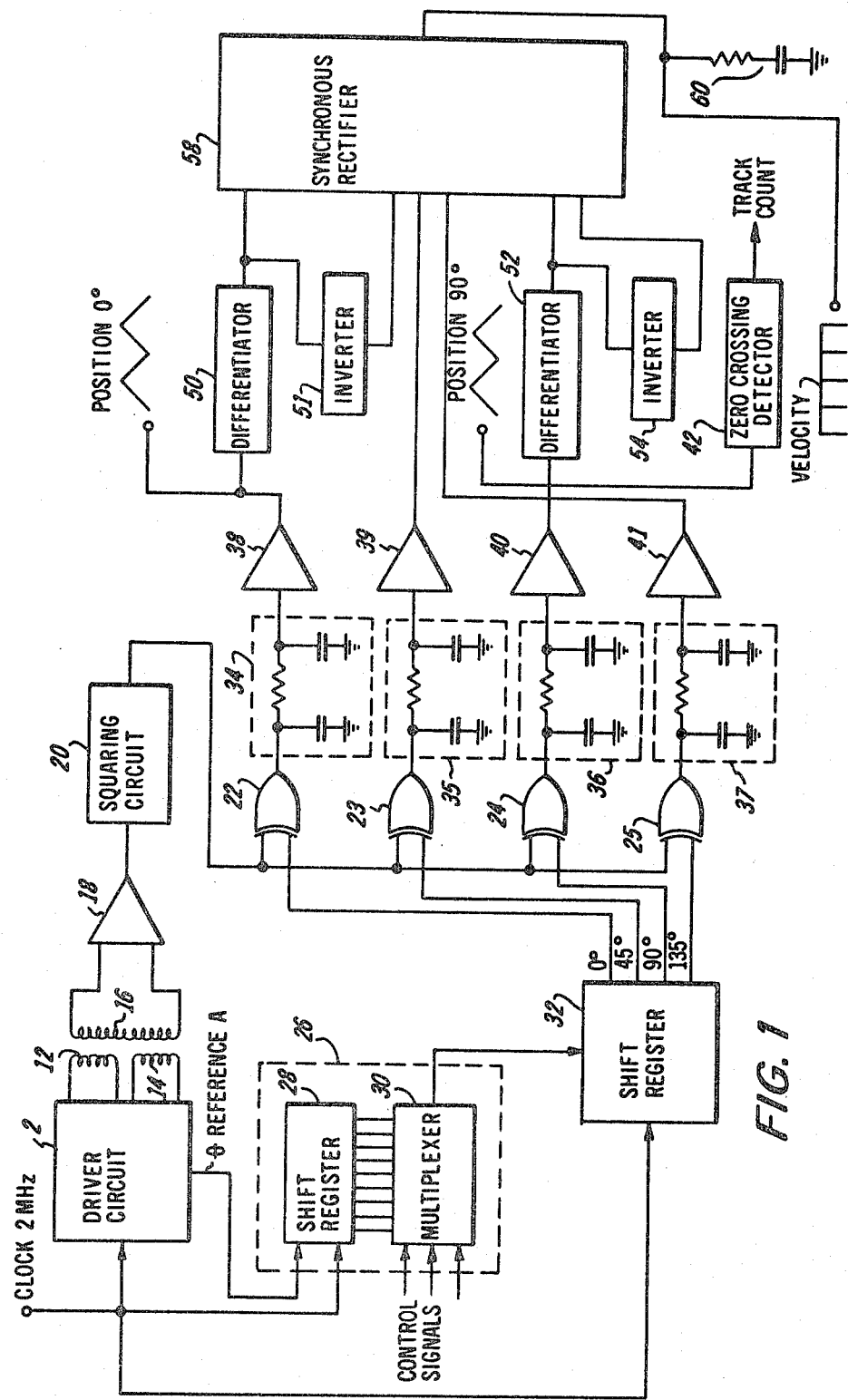
FIG. 1 is a schematic/block diagram of a tracking circuit in accordance with the invention.
Figure 2:
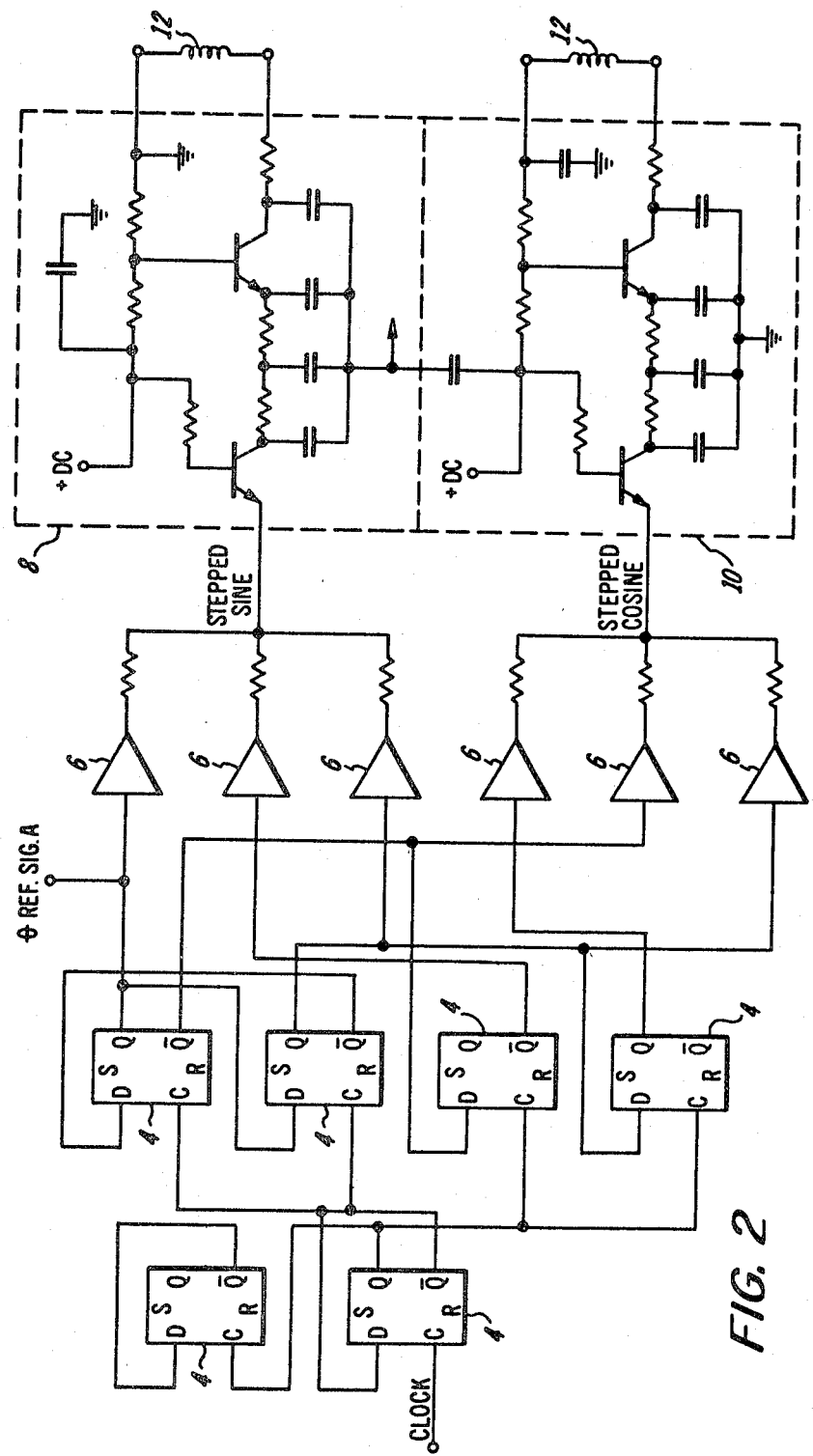
FIG. 2 is a schematic diagram of a component of the tracking circuit of FIG. 1.

Referring now to FIG. 1, a driver circuit 2 receives as an input a 2 MHz clock signal from a conventional clock generator (not shown) and produces at a first output a sine wave signal of 250 KHz, at a second output a cosine wave signal of 250 KHz and of a current amplitude equal to that of the sine wave, and at a third output a square wave signal of 250 KHz designated as phase reference signal A. As shown in FIG. 2, driver circuit 2 can be of the Walsh function type including a plurality of flip flops 4, a plurality of open collector buffer inverters 6 whose outputs are current summed to produce stepped versions of the sine and cosine waves, and first and second filter circuits 8 and 10 to remove the sharp edges or high frequency components of the stepped sine and cosine waves, respectively. Driver circuits of other configurations can be used as long as they produce sine and cosine waves that are phase locked and of equal current amplitude as the circuit to be described uses current drive because the inductance and resistance of the transducer conductors are not tightly controlled during manufacture. The sine and cosine waves are applied to stator windings 12 and 14, respectively. Due to its motion relative to the stator windings, the rotor winding 16 generates a 250 KHz sine wave signal having a phase determined by the magnitude of that relative motion. The rotor winding signal, after being filtered to remove noise, is amplified by amplifier 18 and then supplied to a squaring circuit 20 of conventional design. Squaring circuit 20 is a high speed comparator which produces a square wave signal having a phase and frequency corresponding to that of the rotor signal. A square wave signal is needed since the phase detectors 22, 23, 24 and 25 used in this preferred embodiment are of the conventional exclusive OR type which operate most effectively with square wave inputs having good sharp edges with minimum jitter.

Figure 3:
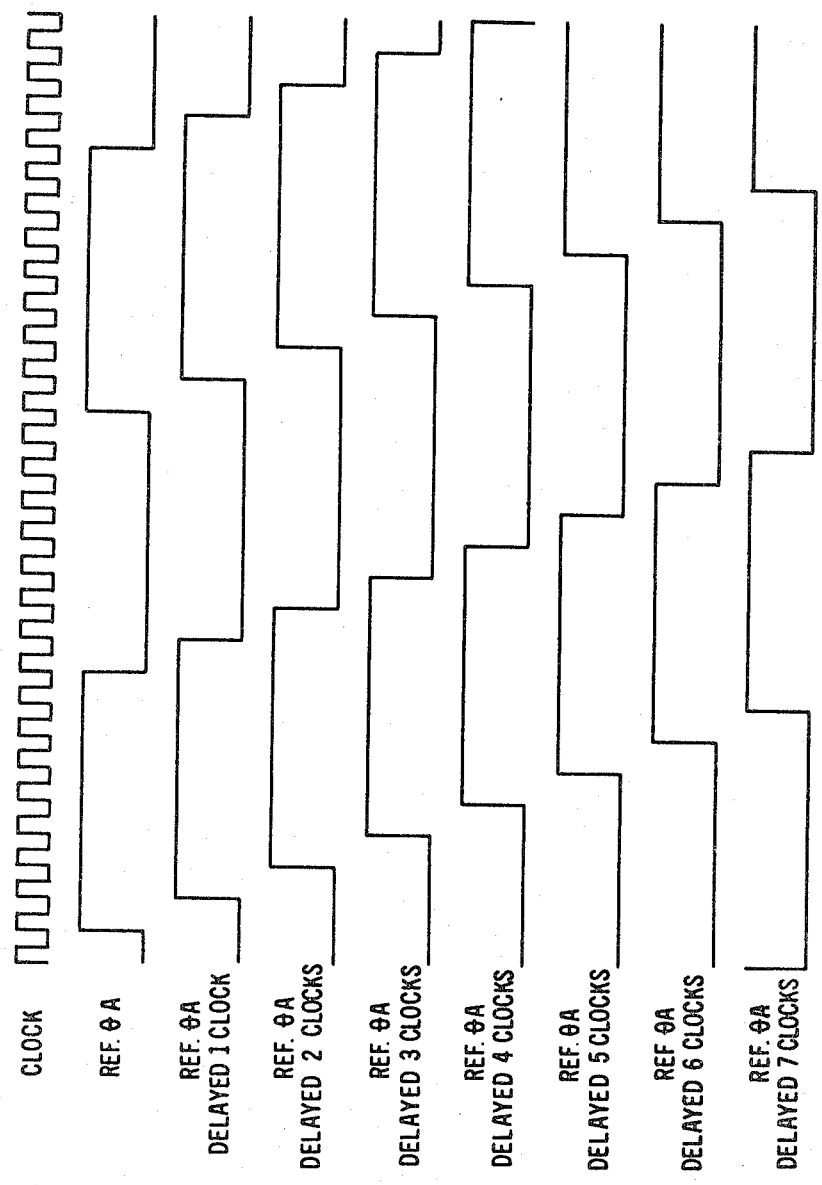
FIG. 3 depicts phase delayed signals generated by the circuit of FIG. 1.

The phase reference signal A is supplied to an 8 stage digital phase shifter circuit 26 which is comprised of an 8 stage shift register 28 and a conventional 8 to 1 multiplexer 30. One input of phase shifter 28 receives phase reference signal A and another input receives the clock signal, while the 8 outputs of the shift register 28 are connected in parallel to the 8 inputs of multiplexer 30. One input to multiplexer 30 is the phase reference signal A and the other inputs are the phase reference signal A delayed progressively by 1 to 7 clock pulses, as shown by the waveforms of FIG. 3. Control signals shown as three bit parallel port are accessed from a microprocessor, for example, or other appropriate logic, and applied to the control terminals of multiplexer 30. An algorithm run by the microprocesor is used to determine which one of the 8 phase reference signals of FIG. 3 corresponds to a desired track position to be accessed, and accordingly determines the multiplexer control signals for accessing that phase reference signal from the multiplexer. With either phases, every eighth track will have the same phase reference. With the track number expressed in binary, the three least significant bits of the track number is the phase number, and those bits are applied to the control signal ports of multiplexer 30.

The accessed output of multiplexer 30, which, as noted, can be any one of the waveforms shown in FIG. 3, for example, the waveform delayed 4 clock pulses, is supplied to a shift register 32 which produces a first output corresponding to its input with no phase shift, a second output shifted 45° relative to the input signal, a third output shifted 90° relative to the input signal, and a fourth output shifted 135° relative to the input signal. Each of the four outputs of shift register 32 is supplied to one of the phase detectors 22, 23, 24, 25 which, as previously noted, also receive the output of squaring circuit 20. The outputs of the phase detectors are high frequency rectangular pulses that are duty cycle or width modulated, that is, the outputs have an amplitude at the logic level, a width or period indicative of the phase relationship between its inputs, and a duty cycle equal to or determined by the carrier frequency. Those outputs have several frequency components, one of which is the low frequency component, on the order of a few thousand cycles per second at high rotor velocity, which is the desired position signal and other unwanted high frequency carrier frequency components that are filtered out by filters 34, 35, 36, 37. Buffers 38, 39, 40, 41, receive the outputs of filters 34, 35, 36, 37, respectively, the buffering being needed in order to drive a low load impedance through the filters. Thus, the low frequency output signals of the buffers are triangular shaped position signals at relative phases of 0°, 45°, 90° and 135°, with the position signals having a frequency which is a function of the phase relationship between the inputs to the phase detectors.

Counting of the transitions of any one of the four reference phased position signals will provide the desire track count for the servo system. Peak detection of the zero phase signal can provide that count, however, peak detectors are gain or amplitude sensitive and may not provide an accurate track count. A more accurate track count is provided by detecting the zero or reference amplitude crossing points of the 90° position signal since, with all the position signals being centered about the same reference amplitude, the reference amplitude crossing points of the 90° position signal will correspond to the peaks of the 0° position signal. Accordingly, the 90° position signal is supplied to a conventional zero crossing detector 42, the output of which is a train of pulses occurring at twice the track count. Accordingly, a simple division by two of the peak detector 42 output signal will provide the track count which is a greater track count by the number of the stages of the digital phase shifter 26 than could be produced with a transducer rotor signal processed in the conventional manner. Thus, the system of the invention has increased the resolution of the transducer.

Figure 4:
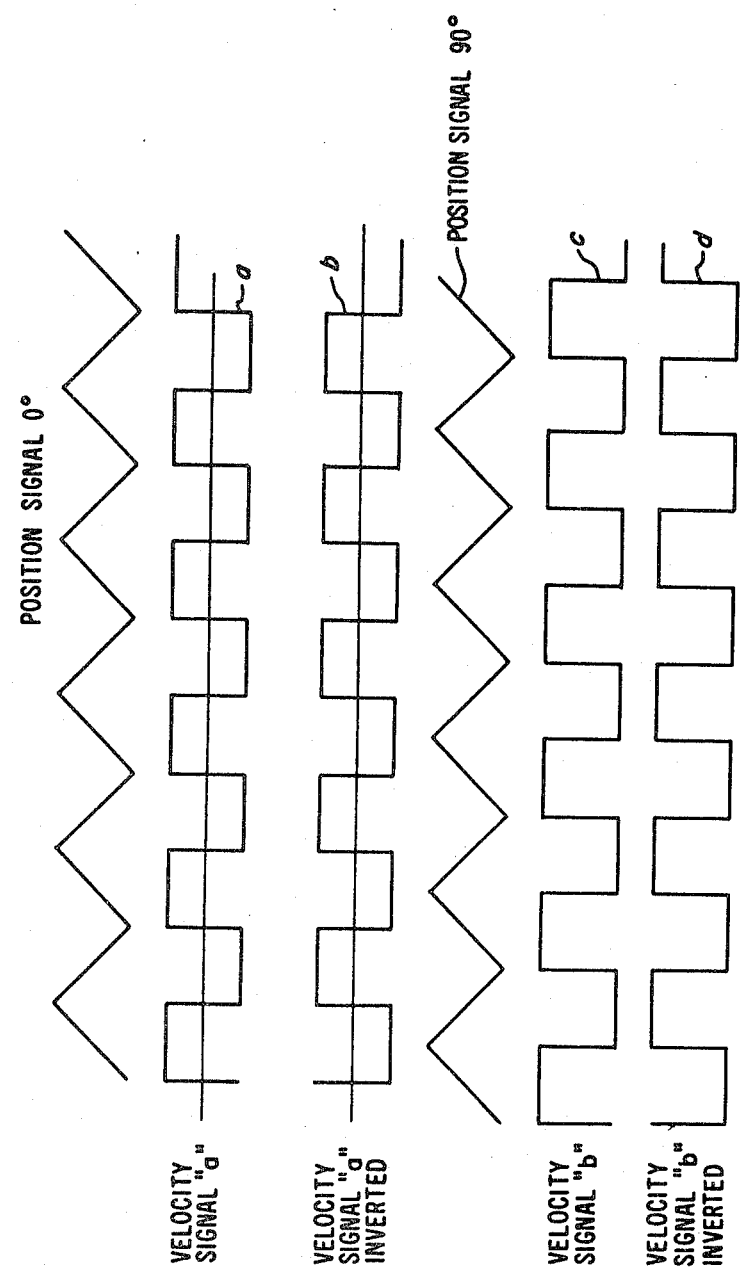
FIG. 4 depicts velocity signals generated by the circuit of FIG. 1.

The four phases of the position signal; i.e., 0°, 45°, 90° and 135°, are used to provide a signal having an amplitude at all times directly proportional to the velocity of the rotor. That is achieved by generating a first velocity signal from the 0° position signal, a signal which is an inversion of the first velocity signal, a second velocity signal from the 90° position signal and an inversion of the second velocity signal. Accordingly, the output of buffer 38 is supplied to a differentiator circuit 50 to produce a velocity signal "a" and that velocity signal "a" is supplied to an inverter 51 to produce a velocity signal "b" which is velocity signal "a" inverted. Likewise, the output of buffer 40 is supplied to a differentiator circuit 52 to produce a velocity signal "c" and that velocity signal "c" is supplied to an inverter 54 to produce a velocity signal "d" which is velocity signal "c" inverted. As is well known, the rate of change of the position signal is indicative of velocity and accordingly,, as shown in FIG. 4, the velocity signals "a" and "c" being derived from triangular shaped position signals will have a substantially square wave shape with a frequency equal to the frequency of the position signals and an amplitude corresponding to the rate of change of the amplitude of the position signals. As also shown in FIG. 4, the vleocity signals "b" and "d" are respectively velocity signals "a" and "c" inverted.

As noted, the velocity signals are only substantially square wave shaped since they are derived from position signals that have somewhat round peaks due to the bandwidth limited nature of the circuit. More exactly, the velocity signals will be somewhat trapezoidal and to get a velocity signal having an amplitude at all times directly proportional to the velocity of the rotor, the flat plateau portions of the velocity signals "a", "b", "c" and "d" must be sequentially sampled.

Returning to FIG. 1, the four velocity signals "a", "b", "c" and "d" are supplied as four inputs to a synchronous rectifier 58, that is, an analog multiplexer. Supplied also to synchronous rectifier 58 are the 45° and 135° position signals. The 45° and 135° position signals act as sampling controls and determine when each plateau portion of each of the four velocity signals "a", "b", "c" and "d" is to be sampled. Specifically, when the 45° and 135° position signals are both of high amplitude (a 11 logic level) position signal "a" is sampled, when the 45° position signal is of high amplitude and the 135° position signal is of low amplitude (a 10 logic level) position signal "b" is sampled, when the 45° position signal is of low amplitude and the 135° position signal is of high amplitude (a 01 logic level) position signal "c" is sampled, and when the 45° and 135° position signals are both of low amplitude (a 00 logic level) position signal "d" is sampled. Thus, the composite output signal of the synchronous rectifier, after filtering by filter 60 to remove high frequency glitches due to sampling, is a signal having an amplitude at all times directly proportional to the velocity of the rotor, that is, there is no rotor velocity error. The polarity of the velocity signal provides an indication of the direction of rotation of the rotor.

The system described could find application in many different types of control systems. For example, it could be used to locate a track of an information storage disk of the magnetic, optical or other type, or locate a print wheel or carriage at the proper printing position. In addition, it is equally applicable to rotary and linear transducers.

I claim:

1. A system for increasing the number of positions trackable by a transducer having relatively moveable windings beyond that permitted by the conductor spacing of the transducer windings, comprising:

first means for generating a clock signal;

second means connected to receive said clock signal for generating both a first signal having a phase determined by the relative motion of said relatively moveable windings and a phase reference signal;

third means connected to receive said clock signal and said phase reference signal for providing a plurality of signals each phase delayed relative to the other of said plurality of signals by one or more clock signal increments;

fourth means connected to receive said plurality of signals and control signals for outputting one of said plurality of signals, said one of said plurality of signals having a phase corresponding to the positioned to be tracked by the transducer;

phase detector means connected to receive said first signal and said one of said plurality of signals for providing a width modulated signal having a low frequency component corresponding to track position;

and filter means for filtering out high frequency components of said width modulated signal to provide a signal indicative of track position.

2. The system of claim 1 in which said first signal is processed by a squaring circuit prior to application to said phase detector means.

3. The system of claim 2 in which said third means is a shift register.

4. The system of claim 3 in which said fourth means is a multiplexer.

* * * * *